(12) United States Patent
Miyake et al.

(10) Patent No.: US 10,615,425 B2
(45) Date of Patent: Apr. 7, 2020

(54) TIN OXIDE, ELECTRODE CATALYST FOR FUEL CELLS, MEMBRANE ELECTRODE ASSEMBLY, AND SOLID POLYMER FUEL CELL

(71) Applicant: Mitsui Mining & Smelting Co., Ltd., Tokyo (JP)

(72) Inventors: Koichi Miyake, Saitama (JP); Susumu Takahashi, Saitama (JP); Hiromu Watanbe, Saitama (JP); Naohiko Abe, Saitama (JP); Ryoma Tsukuda, Saitama (JP); Kenichi Amitani, Saitama (JP); Koji Taniguchi, Saitama (JP); Hiroki Takahashi, Saitama (JP); Yoshihiro Yoneda, Saitama (JP); Kazuhiko Kato, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 192 days.

(21) Appl. No.: 15/735,205

(22) PCT Filed: Jul. 21, 2016

(86) PCT No.: PCT/JP2016/071386
§ 371 (c)(1),
(2) Date: Dec. 11, 2017

(87) PCT Pub. No.: WO2017/022499
PCT Pub. Date: Feb. 9, 2017

(65) Prior Publication Data
US 2018/0175398 A1 Jun. 21, 2018

(30) Foreign Application Priority Data
Aug. 4, 2015 (JP) ................................. 2015-154294

(51) Int. Cl.
*H01M 4/92* (2006.01)
*C01G 19/00* (2006.01)
(Continued)

(52) U.S. Cl.
CPC .......... *H01M 4/925* (2013.01); *C01G 19/006* (2013.01); *C01G 19/02* (2013.01); *C01G 33/006* (2013.01);
(Continued)

(58) Field of Classification Search
CPC .. H01M 4/8657; H01M 4/925; H01M 8/1004; H01M 8/1023; H01M 8/1039;
(Continued)

(56) References Cited

U.S. PATENT DOCUMENTS 7,871,740 B2 1/2011 Tamura et al.
2009/0061276 A1* 3/2009 Tamura ............... H01M 4/8605
429/502
(Continued)

FOREIGN PATENT DOCUMENTS

CN 101568665 A 10/2009
CN 103318948 A 9/2013
(Continued)

OTHER PUBLICATIONS

Machine translation of JP 05-246784 (no date).*
(Continued)

*Primary Examiner* — Amanda C. Walke
(74) *Attorney, Agent, or Firm* — Young & Thompson

(57) ABSTRACT

Disclosed is a tin oxide containing antimony and at least one element A selected from the group consisting of tantalum, tungsten, niobium, and bismuth. The antimony and the at least one element A selected from the group consisting of tantalum, tungsten, niobium, and bismuth are preferably dissolved in a solid state in tin oxide. The ratio of the number of moles of the element A to the number of moles of antimony, i.e., [(the number of moles of the element A/the number of moles of antimony)], is preferably 0.1 to 10.

11 Claims, 2 Drawing Sheets

(51) Int. Cl.
  *C01G 19/02* (2006.01)
  *C01G 33/00* (2006.01)
  *C01G 35/00* (2006.01)
  *H01M 4/86* (2006.01)
  *H01M 8/1004* (2016.01)
  *H01M 8/1023* (2016.01)
  *H01M 8/1039* (2016.01)
  *H01M 8/1018* (2016.01)

(52) U.S. Cl.
  CPC ........ *C01G 35/006* (2013.01); *H01M 4/8657* (2013.01); *H01M 8/1004* (2013.01); *H01M 8/1023* (2013.01); *H01M 8/1039* (2013.01); *C01P 2002/52* (2013.01); *C01P 2004/62* (2013.01); *C01P 2006/40* (2013.01); *H01M 2008/1095* (2013.01)

(58) Field of Classification Search
  CPC .... C01G 19/006; C01G 19/02; C01G 33/006; C01G 35/006; C01P 2002/52; C01P 2004/62
  USPC .......................................................... 429/483
  See application file for complete search history.

(56) References Cited

U.S. PATENT DOCUMENTS

| | | | | |
|---|---|---|---|---|
| 2012/0316061 | A1* | 12/2012 | Nagami | H01M 4/8803 502/339 |
| 2014/0045678 | A1* | 2/2014 | Kumta | B01J 27/135 502/1 |
| 2014/0170476 | A1* | 6/2014 | Tan | H01M 4/131 429/188 |
| 2014/0183054 | A1 | 7/2014 | Legzdins | |
| 2015/0214554 | A1* | 7/2015 | Kaneda | H01M 4/9041 429/484 |
| 2015/0243999 | A1 | 8/2015 | Takahashi et al. | |
| 2017/0279143 | A1* | 9/2017 | Tsukuda | B01J 37/08 |
| 2019/0060874 | A1* | 2/2019 | Peng | C25B 11/0484 |

FOREIGN PATENT DOCUMENTS

| | | |
|---|---|---|
| JP | 5-246784 | 9/1993 |
| JP | H06-183733 | 7/1994 |
| JP | 08-048909 | 2/1996 |
| JP | 08-064035 | 3/1996 |
| JP | 3120663 | 12/2000 |
| JP | 2008-34300 | 2/2008 |
| JP | 2009-114531 | 5/2009 |
| JP | 2015/083383 | 6/2015 |
| WO | 2011-108121 | 9/2011 |
| WO | 2014/136908 | 9/2014 |
| WO | 2015/083383 | 6/2015 |

OTHER PUBLICATIONS

Machine translation of JP 08-064035 (no date).*
Machine translation of JP 2009-114531 (no date).*
Extended European Search Report for Application No. 16832778.1, dated Mar. 11, 2019.
Zhuo, Qiongfang et al., "Efficient Electrochemical Oxidation of Perfluorooctanoate Using a Ti/Sno2—Sb—Bi Anode," Environmental Science & Technology, vol. 45, No. 7, Mar. 1, 2011, pp. 2973-2979.

* cited by examiner

TIN OXIDE, ELECTRODE CATALYST FOR FUEL CELLS, MEMBRANE ELECTRODE ASSEMBLY, AND SOLID POLYMER FUEL CELL

TECHNICAL FIELD

This invention relates to tin oxide. This invention also relates to a fuel cell electrode catalyst which contains the tin oxide, a membrane-electrode assembly (MEA) containing the electrode catalyst, and a polymer electrolyte fuel cell having the MEA.

BACKGROUND ART

Electrode catalysts for fuel cells that have hitherto been used are composed of an electroconductive carbon material, such as carbon black, as a carrier and a noble metal catalyst of various kinds typified by platinum supported on the carrier. It is known that an electrode catalyst of this type involves a problem that the carbon undergoes oxidative corrosion due to potential changes during operation of the fuel cell to eventually cause the supported metal catalyst to agglomerate or fall off. As a result, the performance of the fuel cell deteriorates with the operation time. The problem has been dealt with by depositing a larger quantity of the noble metal catalyst onto the carrier than is actually needed. This method, however, cannot be regarded economically advantageous.

Then, various studies have been conducted on electrode catalysts aiming at improving the performance and economical efficiency of polymer electrolyte fuel cells. For example, it has been proposed to use an electroconductive oxide carrier that is a non-carbonaceous material in place of a conventionally employed electroconductive carbon. Among the so far proposed inorganic oxide carriers is electroconductive tin oxide.

One of the performance properties required of a catalyst carrier in view of the improvement of fuel cell characteristics is to be stable in a working environment and have low electrical resistance. The electroconductive tin oxide, while stable in a working environment, cannot be said to have sufficiently low resistance. As an approach to reducing resistance, various techniques for doping tin oxide with antimony have been studied. For example, Patent Literature 1 below describes a proton conducting inorganic oxide composed of an Sb-doped $SnO_2$ carrier having chemically bonded on the surface thereof a particulate oxide phase containing an element selected from the group consisting of W, Mo, Cr, V, and B. Patent Literature 2 below also describes a catalyst carrier comprising Sb-doped $SnO_2$.

In connection with the technique for doping tin oxide with a dopant element except antimony, using tantalum-containing tin oxide as a catalyst carrier for fuel cells has been proposed (see Patent Literature 3 below).

CITATION LIST

Patent Literature

Patent Literature 1: JP 2008-34300A
Patent Literature 2: WO 2011/108121
Patent Literature 3: WO 2014/136908

SUMMARY OF INVENTION

Technical Problem

When antimony-containing tin oxide is used as a catalyst carrier, antimony can sometimes elute from tin oxide with potential cycles. Because antimony causes high environmental burden, it is necessary to prevent elution of antimony.

An object of the invention is to add improvement to tin oxide for use as a catalyst carrier for fuel cells, more particularly to prevent elution of antimony from antimony-containing tin oxide.

Means for Solving the Problem

The present invention is to provide tin oxide containing antimony and at least one element A selected from the group consisting of tantalum, tungsten, niobium, and bismuth.

The present invention provides a fuel cell electrode catalyst including the above-mentioned tin oxide and a catalyst supported thereon.

The present invention is to provide a membrane-electrode assembly containing a polymer electrolyte membrane and a pair of electrodes, one being an oxygen electrode with the other being a fuel electrode, one on each side thereof, at least one of the oxygen electrode and the fuel electrode containing the fuel cell electrode catalyst.

The present invention provides a polymer electrolyte fuel cell including the membrane-electrode assembly and a separator arranged on each side of the membrane-electrode assembly.

Advantageous Effects of Invention

The tin oxide of the invention contains antimony in a state such that elution of the antimony is prevented. The tin oxide of the invention has low resistance and is stable in an operation environment when used as a catalyst carrier of a fuel cell.

DESCRIPTION OF EMBODIMENTS

Figure 1:
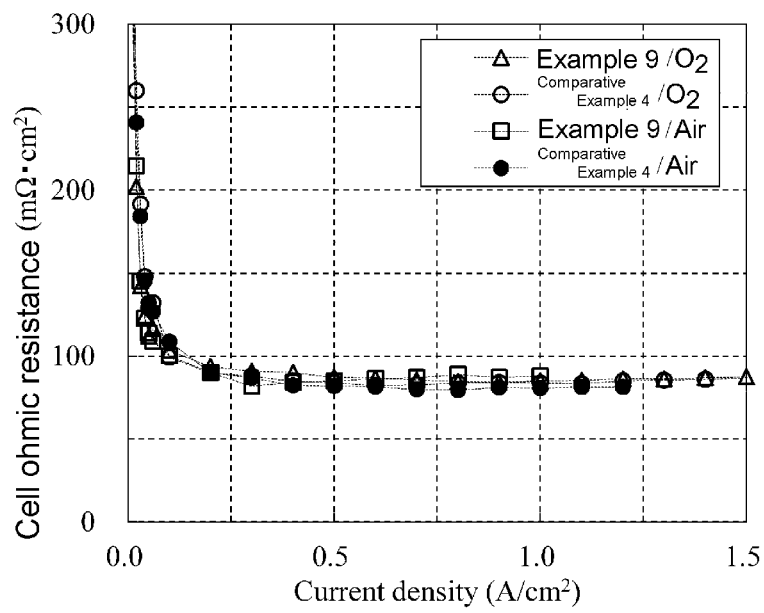
FIG. 1 is a graph showing the relationship between cell ohmic resistance and current density in the polymer electrolyte fuel cells of Example 9 and Comparative Example 4.

The invention will be described on the basis of its preferred embodiments. The tin oxide of the invention contains antimony. The tin oxide of the invention further contains at least one element A selected from the group consisting of tantalum, tungsten, niobium, and bismuth. The tin oxide that can be used in the invention contain an oxide of tin, which is known to have high electroconductivity. An oxide of tin includes $SnO_2$ (tetravalent tin oxide) and SnO (divalent tin oxide). To ensure acid resistance, the oxide of tin for use in the invention is preferably composed mainly of $SnO_2$.

The tin oxide of the invention is usually particulate but is not limited thereto. In the case of particulate tin oxide, it is preferred for the tin oxide particles to have an average particle size $D_{50}$, a diameter at 50% cumulative volume in the particle size distribution measured by a laser diffraction scattering particle size distribution analysis, of 0.001 to 100 μm, more preferably 0.005 to 20 μm, to provide a large specific surface area. The tin oxide particle may have any shape that provides a large specific surface area, such as spherical, polyhedral, platy, spindle-shaped, or a mixture thereof.

Antimony and the element A can exist inside the tin oxide particle or both inside and outside the tin oxide particle. In the case when antimony and/or the element A exist inside the tin oxide particle, they may be dissolved in a solid state in tin oxide, or they may take on the form of a compound (e.g., an oxide of antimony or an oxide of the element A). The phrase "be dissolved in a solid state in tin oxide" as used with respect to antimony indicates that antimony takes the place of tin in the tin oxide lattice. The same applies to the element A. It is preferred for antimony and/or the element A to be solid-state dissolved in tin oxide in the interests of high electroconductivity. The solid dissolved state of antimony and/or the element A may be confirmed by the absence of a diffraction peak other than the peak of a tin oxide such as $SnO_2$ in powder X-ray diffractometry (XRD).

When antimony and/or the element A exist in the form of an oxide in tin oxide, an oxide of antimony is exemplified by, but not limited to, $Sb_2O_5$. An oxide of the element A is exemplified by, but not limited to, $Ta_2O_5$ in the case when the element A is tantalum, and $Nb_2O_5$ when the element A is niobium.

As stated above, the element A is at least one element selected from the group consisting of tantalum, tungsten, niobium, and bismuth. The element A may be one element or a combination of two or more elements. A combination of tantalum and niobium may be a preferred example of the combination of elements.

The ratio of the number of moles of the element A to the number of moles of antimony in the tin oxide, i.e., [(the number of moles of the element A/the number of moles of antimony)], is preferably 0.1 to 10, more preferably 0.2 to 6. When the value of [(the number of moles of the element A/the number of moles of antimony)] is within that range, elution of antimony from tin oxide is effectively prevented. Consequently, when the tin oxide of the invention is used as a carrier of an electrode catalyst for fuel cells, the electrical resistance of the tin oxide is maintained low for an extended period of time. When the tin oxide of the invention is used as a carrier of an electrode catalyst for fuel cells, in order to reduce the initial resistance of the tin oxide as well as to prevent elution of antimony from tin oxide effectively, the value of [(the number of moles of the element A/the number of moles of antimony)] is even more preferably 0.4 to 5 and yet more preferably 1 to 3. As used herein, the phrase "the number of moles of the element A" is, when the element A includes a plurality of elements, the sum of the numbers of moles of the plurality of elements.

The value of [(the number of moles of the element A/the number of moles of antimony)] is determined as follows. The tin oxide of the invention is dissolved by an appropriate method, and the resulting solution is analyzed by ICP-AES to determine the concentrations of antimony and the element A, from which the molar ratio is calculated. X-Ray fluorescent analysis (XRF) may be used instead of ICP-AES.

The antimony content ratio in the tin oxide is influential on the electrical resistance of the tin oxide and the amount of elution of antimony from the tin oxide. From this viewpoint, the ratio of the number of moles of antimony to the number of moles of tin, i.e., (the number of moles of antimony/the number of moles of tin), is preferably 0.001 to 0.1, more preferably 0.005 to 0.08, even more preferably 0.01 to 0.07, yet more preferably 0.01 to 0.05. When the value of (the number of moles of antimony/the number of moles of tin) is within that range, the electrical resistance of the tin oxide is reduced, and the absolute amount of elution of antimony from the tin oxide is reduced. This molar ratio is determined by the same method as used for the determination of [(the number of moles of the element A/the number of moles of antimony)].

The tin oxide of the invention is advantageously prepared by wet synthesis, hydrothermal synthesis, or sol-gel synthesis. The tin oxide synthesis is not limited to these processes. In the following description, tin oxide synthesis will be described with reference to, for instance, wet and sol-gel processes. The wet process includes forming a coprecipitate containing tin, antimony, and the element A and firing the coprecipitate to give a desired tin oxide.

To start with, a tin source compound, such as sodium stannate or tin chloride, is dissolved in a solvent, such as water, to prepare a tin-containing solution. Separately, an element A source compound is dissolved in a solvent, such as water or a water soluble organic solvent (e.g., ethanol), to prepare an element A-containing solution. The element A source compound is exemplified by tantalum chloride and tantalum alkoxides in the case when the element A is tantalum, and niobium chloride when the element A is niobium. The tin-containing solution and the element A-containing solution are mixed together, and the mixed solution is adjusted to a pH that causes coprecipitation using a mineral acid, such as nitric acid, or a basic compound, such as ammonia, thereby to form a slurry containing tin and the element A. These operations may be carried out at, for example, room temperature.

The resulting slurry is mixed with an antimony-containing solution, which is prepared by dissolving an antimony source compound, such as antimony chloride, in a solvent, such as water. The mixture of the slurry and the antimony-containing solution is adjusted to a pH that causes coprecipitation using a mineral acid, such as nitric acid, or a basic compound, such as ammonia, whereby a coprecipitate containing tin, the element A, and antimony is formed in the liquid. These operations may be carried out at, for example, room temperature.

The coprecipitate thus formed is aged by, for example, leaving the liquid to stand at room temperature for a predetermined period of time, for example, 48 hours or shorter.

The coprecipitate is washed by repulping and dried to a solid, which is then fired to give a desired tin oxide. Air is a convenient firing atmosphere. The firing temperature is preferably 400° to 1200° C., more preferably 600° to 1000° C. The firing time is preferably 1 to 24 hours, more preferably 1 to 12 hours.

In the above process, the primary particle size of the tin oxide can be adjusted by controlling the reaction temperature for coprecipitate formation, the pH of the system for coprecipitate formation, the stirring speed of the mother liquid, or the like. The antimony and the element A contents can be adjusted by selecting the antimony to tin concentration ratio and the element A to tin concentration ratio of the mother liquid. Antimony and the element A may be solid-state dissolved in tin oxide by setting the firing temperature to 300° C. or higher.

The sol-gel process for producing the tin oxide of the invention will then be described. The sol-gel process is largely divided into (i) preparation of an element A-containing solution and (ii) formation of tin oxide by a sol-gel process.

Step (i):

An element A-containing solution is prepared by dissolving an element A source compound in a solvent, such as water or a water-soluble organic solvent, e.g., ethanol. Examples of the element A source compound include tantalum chloride (in the case when the element A is tantalum) and niobium chloride (in the case when the element A is niobium). The resulting solution is adjusted to a pH that causes precipitation by the addition of, for example, a basic compound (e.g., ammonia), thereby to form a slurry of an element A-containing precipitate. These operations may be carried out at, for example, room temperature. To the slurry are added an aqueous hydrogen peroxide solution and an organic acid, e.g., tartaric acid, or a basic compound, e.g., ammonia, whereby the precipitate is dissolved to provide an element A-containing solution. It is particularly preferred to use an organic carboxylic acid, such as tartaric acid, to dissolve the precipitate. It is preferred that a 30 mass % hydrogen peroxide solution be added in an amount of 0.1 to 6 ml per mmole of the element A, such as tantalum or niobium. In the manner described, the element A-containing precipitate easily dissolves to give a stable solution.

Step (ii):

The formation of tin oxide by a sol-gel process may be achieved in accordance with, for example, J. Solid State Chemistry, 177 (2004), pp. 1425-1430 as follows. Nitric acid having a predetermined concentration is added to a mixture of metallic tin containing metallic antimony and citric acid, thereby dissolving metallic antimony and metallic tin to give a clear solution. Metallic tin containing metallic antimony is exemplified by antimony-containing tin foil and a mixture of antimony powder and tin powder. To the clear solution is added the element A-containing solution prepared in step (i), and subsequently, a basic compound, such as ammonia, is added thereto to make the liquid basic. The resulting liquid is heated under reflux for a predetermined period of time to form colloid (sol) in the liquid. After cooling the liquid, the solid (gel powder) is harvested by a separation means such as centrifugation, washed, dried, ground to a predetermined particle size, and fired. The firing temperature is preferably 300° to 1200° C., more preferably 400° to 1000° C. The firing time is preferably 1 to 24 hours, more preferably 1 to 12 hours. Antimony and the element A dissolve in a solid state in tin oxide easily under these firing conditions.

For use as, for example, a catalyst carrier for fuel cells, the fired tin oxide particles may further be ground or granulated with a view to enhancing the reactivity and gas diffusion properties appropriate for the use. The grinding may be achieved by means including, but not limited to, a paint shaker and a ball mill. The granulation may be accomplished by means including, but not limited to, spray drying.

The thus prepared tin oxide may have a catalyst of various kinds supported on the surface thereof to provide an electrode catalyst which is an electrode material for fuel cells. Examples of the catalyst include, but are not limited to, noble metals, such as Pt, Ir, Ag, and Pd, and their alloys with transition metals, such as Mn, Fe, Co, and Ni. Oxides and carbonitrides of metals, such as Ti and Zr, are also useful. These catalysts may be used either individually or in combination of two or more thereof. When only pure hydrogen is used as a fuel gas, the above elemental noble metal alone suffices as a catalyst. When in using a reformed gas as a fuel gas, catalyst poisoning with CO is effectively prevented by addition of, e.g., Ru. In that case, the catalyst may take on the form of a Pt—, Ir—, Ag—, or Pd-based alloy containing, e.g., Ru as an alloying metal.

The smaller the particle size of the catalyst metal, the larger the surface area of the metal per unit mass, which is advantageous for the progress of an electrochemical reaction. However, the catalyst metal with too small a particle size has reduced catalytic performance. Taking these into consideration, the average particle size of the catalyst metal is preferably 1 to 10 nm, more preferably 1 to 5 nm.

The amount of the catalyst metal to be supported on the tin oxide carrier is preferably 1 to 60 mass %, more preferably 1 to 30 mass %, relative to the total mass of the catalyst metal and the tin oxide carrier. With the amount of the catalyst metal falling within that range, a sufficient catalyst activity will be exhibited, and the catalyst metal can be supported in a highly dispersed state. The amount of the catalyst metal particles supported may be determined by, for example, ICP-AES.

The catalyst metal is deposited on the tin oxide of the invention by, for example, adding the tin oxide to a solution containing a catalyst metal source and heating the tin oxide under a reducing atmosphere. By that operation, the catalyst metal of the catalyst metal source is reduced and deposited on the surface of the tin oxide.

The electrode catalyst of the invention, which contains the tin oxide having a catalyst metal supported thereon, is used in at least one of a pair of electrodes of an MEA, which includes a polymer electrolyte membrane, an oxygen electrode arranged on one side of the membrane, and a fuel electrode arranged on the other side of the membrane.

The oxygen electrode and the fuel electrode each preferably include a catalyst layer containing the electrode catalyst of the invention and a gas diffusion layer. In order to promote the electrode reaction smoothly, it is preferred that the electrode catalyst be in contact with the polymer electrolyte membrane. The gas diffusion layer functions as a supporting current collector having current collecting capability and also functions for feeding sufficient gas to the electrode catalyst. The gas diffusion layer for use in the invention may be of various conventional materials known for use in fuel cell technology, including carbon paper and carbon cloth, which are porous materials. For example, carbon cloth woven from yarn made of polytetrafluoroethylene-coated carbon fiber and non-coated carbon fiber at a predetermined mixing ratio may be used.

The polymer electrolyte for use in the invention may be of various conventional materials known in the art, including proton-conducting membrane such as perfluoroalkyl sulfonate polymers, hydrocarbon polymers doped with an inorganic acid, such as phosphoric acid, organic/inorganic hybrid polymers partially substituted with a proton conductive functional group, and proton conductors composed of a polymer matrix impregnated with a phosphoric acid or sulfuric acid solution.

The MEA is combined on both sides thereof with a separator to make a polymer electrolyte fuel cell. The separator may have a plurality of ribs extending in a spacedly-parallel relation on the side facing the gas diffusion layer. Every pair of adjacent ribs of the separator provides a groove having a rectangular cross-sectional shape to serve as a gas flow channel allowing a fuel gas or an oxidizing gas (such as air) to pass and be supplied to the electrodes. A fuel gas and an oxidizing gas are fed from their respective feeding means. The two separators having the MEA sandwiched in between are preferably combined with each other with their grooves perpendicular to each other. The above structure constitutes a unit cell. Several tens to several hundreds of the unit cells are stacked one on top of another to provide a fuel cell stack.

While the invention has been described on the basis of its preferred embodiments, it should be understood that the invention is not limited to these embodiments. For example, while the embodiments have been described largely with reference to use of the tin oxide of the invention as a carrier for electrode catalysts of polymer electrolyte fuel cells, the tin oxide may also be of use as a carrier for catalysts in other various types of fuel cells, such as alkali fuel cells and phosphoric acid fuel cells.

EXAMPLES

The invention will now be illustrated in greater detail by way of Examples, but it should be noted that the invention is not construed as being limited thereto. Unless otherwise specified, all the percents are by mass.

Example 1

$SnO_2$ containing Sb and Ta was synthesized by the aforementioned sol-gel process in accordance with the following steps (1) and (2).
(1) Preparation of Tantalum-containing Solution
In 115 ml of ethanol was dissolved 5 g of $TaCl_5$, and 115 ml of water was added thereto to prepare a clear tantalum-containing solution. To the clear solution was dropwise added 25% aqueous ammonia until a pH of 10 was reached. Upon this addition, a precipitate formed in the liquid. The precipitate was collected by filtration and washed. To the resulting solid were added 22.5 g of 30% hydrogen peroxide solution, 10.5 g of oxalic acid dihydrate, and 117 g of pure water to give a clear tantalum-containing solution for the second time.
(2) Formation of Tin Oxide by Sol-gel Process
To a mixture of 10 g of Sn foil containing 2.2% Sb and 33.3 g of citric acid was added 250 ml of a 40% aqueous nitric acid solution to make a clear solution. To the clear solution was added 10.6 g of the clear tantalum-containing solution prepared in (1) above, and 25% aqueous ammonia was added dropwise to the resulting mixed solution until a pH of 8 was reached. The liquid was still clear immediately after completion of the addition. The liquid was refluxed at 100° C. for 2 hours, whereby the liquid became while turbid. After cooling, the liquid was centrifuged to collect solid, which was washed with water, dried in the atmosphere at 120° C. overnight, and ground in a mortar. The ground solid was fired in the atmosphere at 900° C. for 2 hours. A five gram portion of the fired particles was put in a 100 ml-volume plastic container together with 150 g of 2 mm-diameter zirconia balls, and enough pure water was added to cover the solid matter. The container was shaken on a paint shaker (from Asada Iron Works Co., Ltd.) for 1 hour to pulverize the particles. The powder was collected by filtration and dried at 120° C. to give tin oxide particles containing antimony and tantalum. The particles were generally spherical and had a volume cumulative average particle size $D_{50}$ of 0.78 μm. The powder XRD pattern of the particles showed only the peak of rutile tin oxide with no peak of antimony oxide or tantalum oxide. The tin, antimony, and tantalum contents determined by ICP-AES were as shown in Table 1 below. Table 1 also shows the Ta to Sb molar ratio and the Sb to Sn molar ratio calculated from these contents.

Examples 2 to 4

Tin oxide particles containing antimony and tantalum were obtained in the same manner as in Example 1, except that the amount of the clear tantalum-containing solution to be used in the preparation of the mixed solution in step (2) was changed so as to result in the tantalum content of the tin oxide as shown in Table 1. The powder XRD pattern of the particles showed only the peak of rutile tin oxide with no peak of antimony oxide or tantalum oxide.

Example 5

Niobium was used as the element A. $SnO_2$ containing Sb and Nb was synthesized by the sol-gel process in accordance with the following steps (1) and (2).
(1) Preparation of Niobium-containing Solution
In 115 ml of ethanol was dissolved 3.8 g of $NbCl_5$, and 115 ml of water was added thereto to make a clear niobium-containing solution. To the clear solution was dropwise added 25% aqueous ammonia until a pH of 10 was reached. Upon this addition, a precipitate formed in the liquid. The precipitate was collected by filtration and washed. To the resulting solid were added 22.5 g of 30% hydrogen peroxide solution, 10.5 g of oxalic acid dihydrate, and 117 g of pure water to give a clear niobium-containing solution for the second time.
(2) Formation of Tin Oxide by Sol-gel Process
To a mixture of 10 g of Sn powder, 0.22 g of Sb powder, and 33.3 g of citric acid was added 250 ml of a 40% aqueous nitric acid solution to prepare a clear solution. To the clear solution was added 26.4 g of the clear niobium-containing solution prepared in (1) above, and 25% aqueous ammonia was added dropwise to the resulting mixed solution until a pH of 8 was reached. The liquid was still clear immediately after completion of the addition. The liquid was refluxed at 100° C. for 2 hours, whereupon the liquid became while turbid. After cooling, the liquid was centrifuged to harvest solid, which was washed with water and further worked up in the same manner as in Example 1 to give tin oxide particles containing antimony and niobium. The powder XRD pattern of the particles showed only the peak of rutile tin oxide with no peak of antimony oxide or niobium oxide.

Example 6

Tin oxide particles containing antimony and niobium were obtained in the same manner as in Example 5, except that the amount of the clear niobium-containing solution to be used in the preparation of the mixed solution in step (2) of Example 5 was changed so as to result in the niobium content of the tin oxide as shown in Table 1. The powder XRD pattern of the particles showed only the peak of rutile tin oxide with no peak of antimony oxide or niobium oxide.

Comparative Example 1

Tin oxide particles containing only antimony were obtained by a sol-gel process in the same manner as in Example 1, except that the tantalum-containing solution as used in step (1) was not used. As a result of powder XRD, only the peak of rutile tin oxide was observed.

Examples 7 and 8 and Comparative Examples 2 and 3

Tin oxide particles were obtained in the same manner as in Example 1, except that the Sn foil containing 2.2% Sb used in the preparation of a mixed solution in step (2) of Example 1 was replaced with prescribed amounts of Sn powder and Sb powder and that the amount of the tantalum-containing clear solution was changed so as to result in the antimony and tantalum contents of the tin oxide as shown in Table 1. As a result of powder XRD, only the peak of rutile tin oxide was observed with no peaks of antimony oxide or tantalum oxide in Examples 7 and 8, whereas only the peak of rutile tin oxide was observed in Comparative Examples 2 and 3.

Evaluation

The tin oxide particles obtained in Examples and Comparative Examples were evaluated by determining volume resistivity and conducting antimony elution test in accordance with the methods below. The results obtained are shown in Table 1.

(a) Volume Resistivity

The volume resistivity was determined using a powder resistivity measuring system PD-51 and a resistivity meter MCP-T610 (both available from Mitsubishi Chemical Analytec Co., Ltd.) as follows. One gram of the sample was put in a probe cylinder, and the probe unit was set on PD-51. A load of 18 kN was applied to the sample using a hydraulic jack to make a 20 mm diameter cylindrical pellet. The resistivity of the pellet was measured with MCP-T610. The volume resistivity was calculated from the measured ohmic value and the sample thickness and rated excellent (E), good (G), fair (F), or poor (P) according to the following scheme:

E: Volume resistivity of 15Ω·cm or less
G: Volume resistivity of more than 15Ω·cm and not more than 100Ω·cm.
F: Volume resistivity of more than 100Ω·cm and not more than 1000Ω·cm.
P: Volume resistivity of more than 1000Ω·cm.

(b) Antimony elution test

In a 500 ml beaker was put 400 ml of 5 mol/l nitric acid, and 4 g of the tin oxide particles obtained in each of Examples and Comparative Examples. In order to detect eluted antimony with high accuracy, the liquid was stirred at 25° C., at which metaantimonic acid hardly forms, at 250 rpm for one week. After one-week stirring, the solid matter was collected by filtration and washed. The filtrate was analyzed by ICP-AES to determine the amount of eluted antimony. The antimony elution defined to be the ratio of eluted antimony, i.e., (amount of eluted antimony)/(antimony content before elution) (unit: ppm), was calculated.

Examples and Comparative Examples were divided into three groups on the basis of substantial similarity of Sb to Sn molar ratio: (1) Comparative Example 1 and Examples 1 to 6, (2) Comparative Example 2 and Example 7, and (3) Comparative Example 3 and Example 8. An elution ratio defined to be the ratio of the antimony elution in Example to the antimony elution in Comparative Example, i.e., (the antimony elution in Example)/(the antimony elution in Comparative Example), was calculated for each group. The elution ratio thus obtained was rated excellent (E), good (G), fair (F), or poor (P) according to the following scheme:

E: Elution ratio of smaller than 0.50.
G: Elution ratio of 0.50 to smaller than 0.80.
F: Elution ratio of 0.80 to smaller than 1.
P: Elution ratio of 1.

As a result of the ICP-AES analysis of the filtrate, tantalum and niobium were not detected, their concentrations being below the detection limit.

TABLE 1

| | Results of Analysis (mass %) | | | | Composition (molar Ratio) | | Results of Evaluation | | | | |
|---|---|---|---|---|---|---|---|---|---|---|---|
| | | | Element A | | Element | | Sb Elution | Sb Elution | | Volume Resistivity | |
| | Sn | Sb | Ta | Nb | A/Sb | Sb/Sn | (ppm) | Ratio | Rating | (Ω·cm) | Rating |
| Ex. 1 | 73.7 | 1.58 | 1.11 | — | 0.47 | 0.021 | 512 | 0.85 | F | 2.35E+01 | G |
| Ex. 2 | 73.6 | 1.49 | 2.85 | — | 1.29 | 0.020 | 447 | 0.75 | G | 5.91E+01 | G |
| Ex. 3 | 67.2 | 1.44 | 5.52 | — | 2.58 | 0.021 | 243 | 0.41 | E | 8.23E+01 | G |
| Ex. 4 | 63.7 | 1.36 | 11.30 | — | 5.59 | 0.021 | 199 | 0.33 | E | 1.00E+03 | F |
| Ex. 5 | 74.4 | 1.45 | — | 1.63 | 1.48 | 0.019 | 450 | 0.75 | G | 5.01E+01 | G |
| Ex. 6 | 73.2 | 1.68 | — | 2.61 | 2.03 | 0.022 | 338 | 0.56 | G | 1.64E+02 | F |
| Comp. Ex. 1 | 77.0 | 1.58 | — | — | 0.00 | 0.020 | 600 | 1.00 | P | 1.44E+02 | F |
| Ex. 7 | 70.4 | 3.15 | 2.76 | — | 0.59 | 0.044 | 762 | 0.86 | F | 3.46E+00 | E |
| Comp. Ex. 2 | 73.1 | 3.18 | — | — | 0.00 | 0.042 | 881 | 1.00 | P | 9.35E−01 | E |
| Ex. 8 | 66.9 | 6.36 | 2.21 | — | 0.23 | 0.093 | 2830 | 0.91 | F | 2.21E+00 | E |
| Comp. Ex. 3 | 67.3 | 6.40 | — | — | 0.00 | 0.093 | 3125 | 1.00 | P | 1.38E+00 | E |

As is apparent from the results in Table 1, the tin oxide particles of Example 1 through 6 had a volume resistivity on the order of not more than ten to the third power ohm-centimeter as a preferred catalyst, which is almost equal to the electrical resistance of the tin oxide of Comparative Example 1, and yet suffered less antimony elution than Comparative Example 1.

It is also seen from comparison between Examples 7 and 8 and Comparative Examples 2 and 3 that the tin oxides of Comparative Examples 2 and 3, while having low volume resistivity similarly to those of Examples 7 and 8, suffered considerable antimony elution.

Example 9

An electrode catalyst for a cathode of a polymer electrolyte fuel cell was made using the tin oxide containing antimony and tantalum obtained in Example 2 as a carrier, and a polymer electrolyte fuel cell was assembled using the resulting electrode catalyst in accordance with the following procedures.

In 295 ml of pure water was dissolved 5 ml of an $H_2PtCl_6$ solution (corresponding to 1 g Pt) and reduced using 15.3 g of $NaHSO_3$. After dilution with 1400 ml of pure water, 120 ml of a 35% hydrogen peroxide solution was added thereto dropwise while adjusting the pH of the system to about 5 by the addition of a 5% NaOH aqueous solution, thereby to prepare a liquid containing platinum colloid. During addition of hydrogen peroxide solution, the system was maintained at pH of about 5 using a 5% NaOH aqueous solution. A portion corresponding to 0.435 g Pt was weighed out from the resulting liquid, and 5 g of the carrier was added thereto, followed by mixing at 90° C. for 3 hours. The liquid was cooled, followed by solid-liquid separation. The collected water-containing powder was diluted with 1500 ml of pure water and boiled at 90° C. for 1 hour to be freed of chloride ions. After cooling, the liquid was separated into solid and liquid. This washing operation was performed four times, and the finally separated solid was dried in the air at 60° C. for 12 hours, whereby platinum containing non-stoichiometric platinum oxide was deposited on the surface of the carrier. The carrier was then heat treated in a 4 vol % $H_2/N_2$ atmosphere at 80° C. for 2 hours to reduce platinum. The amount of platinum supported was found to be 7.9% relative to the total mass of the catalyst and the carrier as determined by ICP-AES.

In a container were put 1.3 g of the resulting electrode catalyst and 10 mm-diameter yttrium-stabilized zirconia balls. Pure water, ethanol, and isopropyl alcohol (amounting to 1.69 g in total) were added thereto in that order in a mass ratio of 35:45:20 to prepare an ink. The ink was dispersed by ultrasonication for 3 minutes and then agitated on a planetary mixer Thinky ARE 310 at 800 rpm for 20 minutes. To the ink was added 5% Nafion® (274704-100ML, from Sigma-Aldrich) as an ionomer and a binder in an amount resulting in a Nafion to tin oxide particles mass ratio of 0.074, and the mixture was dispersed by ultrasonication and agitated on a planetary mixer under the same conditions as above. The thus prepared ink was applied to a polytetrafluoroethylene sheet using a bar coater and dried at 60° C. to form a cathode catalyst layer.

In a container were put 1.00 g of carbon black having platinum supported thereon (TEC10E50E, from Tanaka Precious Metals) and 10 mm-diameter yttrium-stabilized zirconia balls. Pure water, ethanol, and isopropyl alcohol (amounting to 12.8 g in total) were added thereto in that order in a mass ratio of 45:35:20 to prepare an ink. The ink was dispersed by ultrasonication for 3 minutes and then agitated on a planetary mixer Thinky ARE 310 at 800 rpm for 20 minutes. To the ink was added 5% Nafion® (274704-100ML, from Sigma-Aldrich) in an amount resulting in a Nafion to Pt-on-carbon black mass ratio of 0.70, and the mixture was dispersed by ultrasonication and agitated on a planetary mixer under the same conditions as above. The thus prepared ink was applied to a polytetrafluoroethylene sheet using a bar coater and dried at 60° C. to form an anode catalyst layer.

Each of the two polytetrafluoroethylene sheets, one having the cathode catalyst layer and the other the anode catalyst layer, was cut into a 54-mm square. The cut sheets were superposed to sandwich an electrolyte membrane made of Nafion® (NRE-212, from Du-Pont) therebetween and hot pressed at 140° C. and 25 kgf/cm$^2$ in the atmosphere for 2 minutes to transfer the catalyst layers. Thus, a catalyst-coated membrane (CCM), i.e., a polymer electrolyte membrane of Nafion having a cathode and an anode catalyst layer on the opposite sides thereof was made. The amounts of platinum in the cathode and the anode catalyst layer were 0.110 mg$_{pt}$/cm$^2$ and 0.085 mg$_{pt}$/cm$^2$, respectively.

The CCM was sandwiched between a pair of gas diffusion layers (25BCH, from SGL Carbon). Separators made of paired carbon plate and having gas flow channels were placed to sandwich the resulting cell therebetween to make a polymer electrolyte fuel cell, which corresponded to a JAM standard cell.

The cell ohmic resistance of the resulting polymer electrolyte fuel cell was determined by the method below. The results are shown in FIG. 1. FIG. 1 also shows the results obtained from a comparative fuel cell (Comparative Example 4) made by using Pt/CB (platinum/carbon black) as a cathode catalyst, which was the same as the anode catalyst.

Figure 2A:
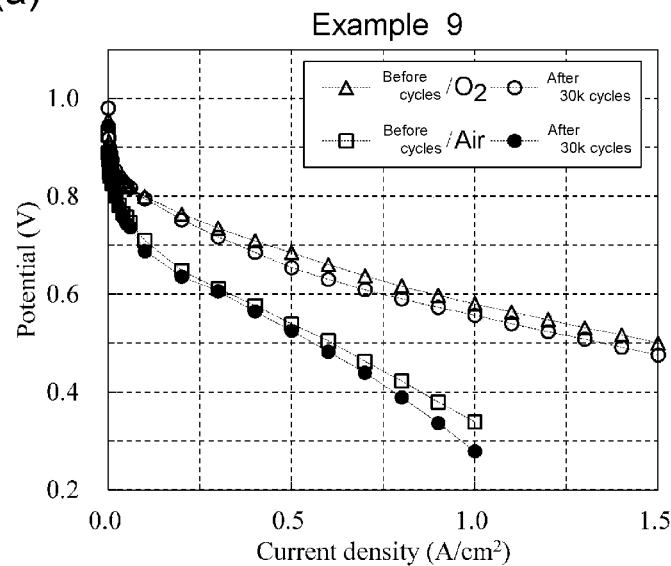
FIG. 2(a) is a graph showing the power output characteristics (I-V characteristics) of the polymer electrolyte fuel cell of Example 9 before and after start-stop cycles.
Figure 2B:
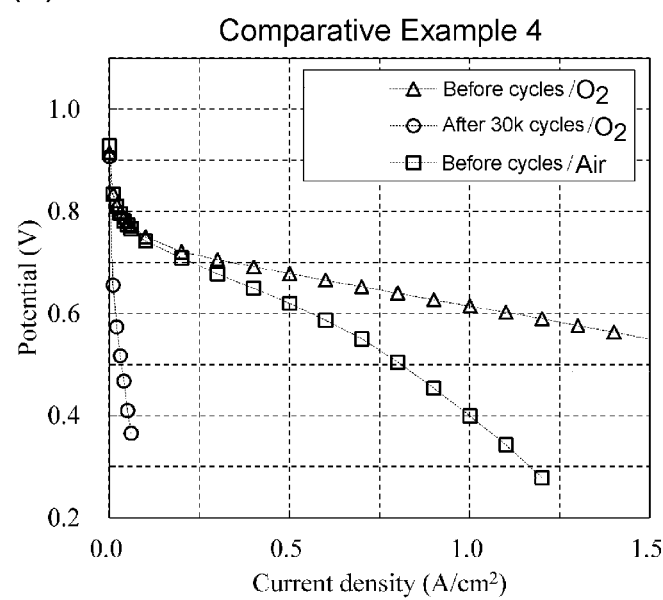
FIG. 2(b) is a graph showing the power output characteristics (I-V characteristics) of the polymer electrolyte fuel cell of Comparative Example 4, in which Pt/CB was used as a cathode catalyst, before and after start-stop cycles.

The resulting polymer electrolyte fuel cell was also evaluated for power output characteristics (I-V characteristics) before and after a start-stop cycle test in accordance with the method below. The results are shown in FIG. 2(a). FIG. 2(b) shows the results obtained from the comparative fuel cell of Comparative Example 4, which was made by using Pt/CB (platinum/carbon black) as a cathode catalyst, which was the same as the anode catalyst.

(a) Method for Determining Cell Ohmic Resistance and Power Output Characteristics (I-V Characteristics)

Hydrogen gas was fed to the anode side of the polymer electrolyte fuel cell, while oxygen gas or air was fed to the cathode side. The flow rates were set so that the hydrogen utilization was 70% and the oxygen utilization was 40%. The fuel cell temperature was adjusted to 80° C., and the gases to be fed were previously humidified to 100% RH through the respective external humidifiers. The relationship between cell voltage and current density (I-V characteristics) and the relationship between cell ohmic resistance and current density were determined.

(b) Method for Determining Power Output Characteristics Before and after Start-stop Cycle Test The temperature of the fuel cell was adjusted to 80° C., and hydrogen gas and nitrogen gas both humidified to 100% RH were fed to the anode side and the cathode side, respectively, each at a flow rate of 100 ml/min. The voltage when the cathode potential was 1.0 V relative to the anode potential was taken as a first voltage. The voltage when the cathode potential was 1.5 V relative to the anode potential was taken as a second voltage. A voltage change from the first to the second voltage at a rate of 0.5 V/sec followed by a voltage change from the second to the first voltage at a rate of 0.5 V/sec made one start-stop cycle. After a total of 30,000 cycles were conducted to carry out a start-stop cycle test, the cell ohmic resistance and power output characteristics (I-V characteristics) were determined under the same conditions as described above.

As is apparent from the results in FIG. 1, the cell ohmic resistance of the fuel cell of Example 9 was substantially equal to that of the fuel cell of Comparative Example 4 in which Pt/CB was used as a cathode catalyst.

As is apparent from the comparison between FIGS. 2(a) and 2(b), the fuel cell of Example 9 showed almost no changes in power output characteristics after the start-stop cycle test. In contrast, the fuel cell of Comparative Example 4 in which Pt/CB was used as a cathode catalyst showed great reductions in power output characteristics after the test. In Comparative Example 4 (FIG. 2(b)), the I-V characteristics determined with oxygen gas feed deteriorated considerably after the start-stop cycles. Seeing that similar deterioration would happen with air feed, determination of I-V characteristics with air feed was not made.

The invention claimed is:
1. Tin oxide containing antimony and at least one element A selected from the group consisting of tantalum, tungsten, niobium, and bismuth;
   said tin oxide being an electrode material of a fuel cell;
   wherein a mole ratio of antimony to tin in said tin oxide is 0.01 to 0.05.
2. The tin oxide according to claim 1, wherein the antimony and the at least one element A selected from the group consisting of tantalum, tungsten, niobium, and bismuth are dissolved in a solid state in tin oxide.
3. The tin oxide according to claim 1, wherein the antimony and/or the at least one element A selected from the group consisting of tantalum, tungsten, niobium, and bismuth are present in tin oxide in the form of an oxide.
4. The tin oxide according to claim 1, wherein the ratio of the number of moles of the element A to the number of moles of antimony is 0.1 to 10.

5. A fuel cell electrode catalyst comprising the tin oxide according to claim 1 having a catalyst supported thereon.

6. A membrane-electrode assembly comprising a polymer electrolyte membrane and a pair of electrodes, one being an oxygen electrode with the other being a fuel electrode, one on each side thereof, at least one of the oxygen electrode and the fuel electrode containing the fuel cell electrode catalyst according to claim 5.

7. A polymer electrolyte fuel cell comprising the membrane-electrode assembly according to claim 6 and a separator on each side of the membrane-electrode assembly.

8. The tin oxide according to claim 2, wherein the ratio of the number of moles of the element A to the number of moles of antimony is 0.1 to 10.

9. The tin oxide according to claim 3, wherein the ratio of the number of moles of the element A to the number of moles of antimony is 0.1 to 10.

10. A fuel cell electrode catalyst comprising the tin oxide according to claim 2 having a catalyst supported thereon.

11. A fuel cell electrode catalyst comprising the tin oxide according to claim 3 having a catalyst supported thereon.

\* \* \* \* \*